US008635066B2

(12) United States Patent
Morrison

(10) Patent No.: US 8,635,066 B2
(45) Date of Patent: Jan. 21, 2014

(54) CAMERA-ASSISTED NOISE CANCELLATION AND SPEECH RECOGNITION

(75) Inventor: Andrew R. Morrison, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 628 days.

(21) Appl. No.: 12/759,907

(22) Filed: Apr. 14, 2010

(65) Prior Publication Data

US 2011/0257971 A1    Oct. 20, 2011

(51) Int. Cl.
*G10L 15/08* (2006.01)
*G10L 15/24* (2013.01)

(52) U.S. Cl.
USPC .............. 704/251; 704/E15.041; 704/231

(58) Field of Classification Search
None
See application file for complete search history.

(56) References Cited

U.S. PATENT DOCUMENTS

| | | | | |
|---|---|---|---|---|
| 4,975,960 A * | 12/1990 | Petajan | ...................... | 704/251 |
| 5,586,215 A * | 12/1996 | Stork et al. | ...................... | 704/232 |
| 5,617,855 A * | 4/1997 | Waletzky et al. | ............. | 600/586 |
| 5,621,858 A * | 4/1997 | Stork et al. | ...................... | 704/232 |
| 5,666,400 A * | 9/1997 | McAllister et al. | ......... | 379/88.01 |
| 5,680,481 A * | 10/1997 | Prasad et al. | .................. | 382/190 |
| 6,185,529 B1 * | 2/2001 | Chen et al. | ...................... | 704/251 |
| 6,272,466 B1 * | 8/2001 | Harada et al. | ................. | 704/270 |
| 6,377,922 B2 * | 4/2002 | Brown et al. | .................. | 704/251 |
| 6,466,250 B1 * | 10/2002 | Hein et al. | ................. | 348/14.16 |
| 6,594,629 B1 * | 7/2003 | Basu et al. | ...................... | 704/251 |
| 6,654,721 B2 * | 11/2003 | Handelman | ................... | 704/270 |
| 6,701,293 B2 * | 3/2004 | Bennett et al. | ................ | 704/251 |
| 6,707,921 B2 * | 3/2004 | Moore | .......................... | 381/327 |
| 6,816,836 B2 * | 11/2004 | Basu et al. | ...................... | 704/270 |
| 6,996,525 B2 * | 2/2006 | Bennett et al. | ................ | 704/231 |
| 7,130,446 B2 * | 10/2006 | Rui et al. | ...................... | 382/103 |
| 7,151,843 B2 * | 12/2006 | Rui et al. | ...................... | 382/103 |
| 7,171,025 B2 * | 1/2007 | Rui et al. | ...................... | 382/103 |
| 7,219,062 B2 * | 5/2007 | Colmenarez et al. | ......... | 704/270 |
| 7,246,058 B2 | 7/2007 | Burnett | | |
| 7,428,315 B2 * | 9/2008 | Rui et al. | ...................... | 382/103 |
| 7,433,484 B2 | 10/2008 | Asseily et al. | | |
| 7,433,495 B2 * | 10/2008 | Rui et al. | ...................... | 382/103 |
| 7,587,318 B2 * | 9/2009 | Seshadri | ....................... | 704/231 |
| 7,676,369 B2 * | 3/2010 | Fujimoto et al. | .............. | 704/270 |
| 7,860,718 B2 * | 12/2010 | Lee et al. | ....................... | 704/276 |

(Continued)

FOREIGN PATENT DOCUMENTS

| | | |
|---|---|---|
| KR | 20100003672 | 1/2010 |
| WO | WO2007114346 A1 | 10/2007 |
| WO | WO2008069519 A1 | 6/2008 |

OTHER PUBLICATIONS

Tim Barry et al. "The Simultaneous Use of Three Machine Speech Recognition Systems to Increase Recognition Accuracy", IEEE NAECON, p. 667-671, 1994.*

(Continued)

*Primary Examiner* — Talivaldis Ivars Smits
(74) *Attorney, Agent, or Firm* — Lee & Hayes, PLLC

(57) ABSTRACT

Methods, system, and articles are described herein for receiving an audio input and a facial image sequence for a period of time, in which the audio input includes speech input from multiple speakers. The audio input is extracted based on the received facial image sequence to extract a speech input of a particular speaker.

28 Claims, 6 Drawing Sheets

(56) References Cited

U.S. PATENT DOCUMENTS

2006/0031067 A1    2/2006   Kaminuma
2007/0136071 A1    6/2007   Lee et al.
2008/0306733 A1   12/2008   Ozawa
2010/0063820 A1*   3/2010   Seshadri ........................ 704/251

OTHER PUBLICATIONS

PCT Search Report & Written Opinion mailed Dec. 9, 2011 for PCT Application No. PCT/US11/31443, 10 pages.

* cited by examiner

CAMERA-ASSISTED NOISE CANCELLATION AND SPEECH RECOGNITION

BACKGROUND

The ability of speech recognition software to correctly interpret spoken speech is often affected by background noise and audio interference. Thus, while some speech recognition software may work effectively in a low ambient noise environment, such as in an office setting, noisy environments may significantly degrade the ability of speech recognition software to transform spoken speech into meaningful electronic or text data.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for camera-assisted speech recognition on an electronic device. The electronic device is generally equipped with an audio sensor (e.g., a microphone) that captures audio from an environment, as well as an image sensor (e.g., a camera) that is able to detect and capture the facial movements of a speaker. The facial movements of the speaker are captured as a sequence of facial images. Accordingly, by analyzing the facial movements of the speaker in the facial images, irrelevant audio such as background noise and electronic interface in the captured audio may be eliminated. Further, once the irrelevant audio portions have been eliminated, the remaining audio portions may be further analyzed by the speech recognition software of the electronic device for speech clarity and interpretability into electronic data. As a result, an audio segment in each remaining audio portion that is of sufficient clarity may be transformed into symbol sequences, that is, a form of electronic data that may be further converted into text data and/or machine-readable data.

However, for an audio segment in each remaining audio portion that cannot be transformed into symbol sequences with a predetermined degree of certainty, that is, an indecipherable audio segment, the speech recognition software may call upon visual interpretation software of the electronic device to provide interpretation assistance. Accordingly, the visual recognition software may analyze the facial movements of the speaker in the facial image sequences that correspond temporally to these indecipherable audio segments and generate symbol sequences based on such facial movements of the speaker. The symbol sequences produced by the speech recognition software and the visual interpretation software may be combined into a synthesized symbol sequence.

The electronic device may use the synthesized symbol sequence for various purposes. For example, the electronic device may be a personal computer that generates text based on the synthesized symbol sequence, in which the generated text is part of a document or electronic message that is being composed. In another example, the electronic device may be a telecommunication device, and the synthesized symbol sequence may include both a command and text data, such as a command to compose an email to a specific person, and text that make up the email. In an additional example, the electronic device may an embedded device in a larger electronic system (e.g., voice recognition device in an automobile), and the synthesized symbol sequence correspond to a command for the larger system to perform a specific function (e.g., turn on the engine of the automobile).

Overview

Figure 1:
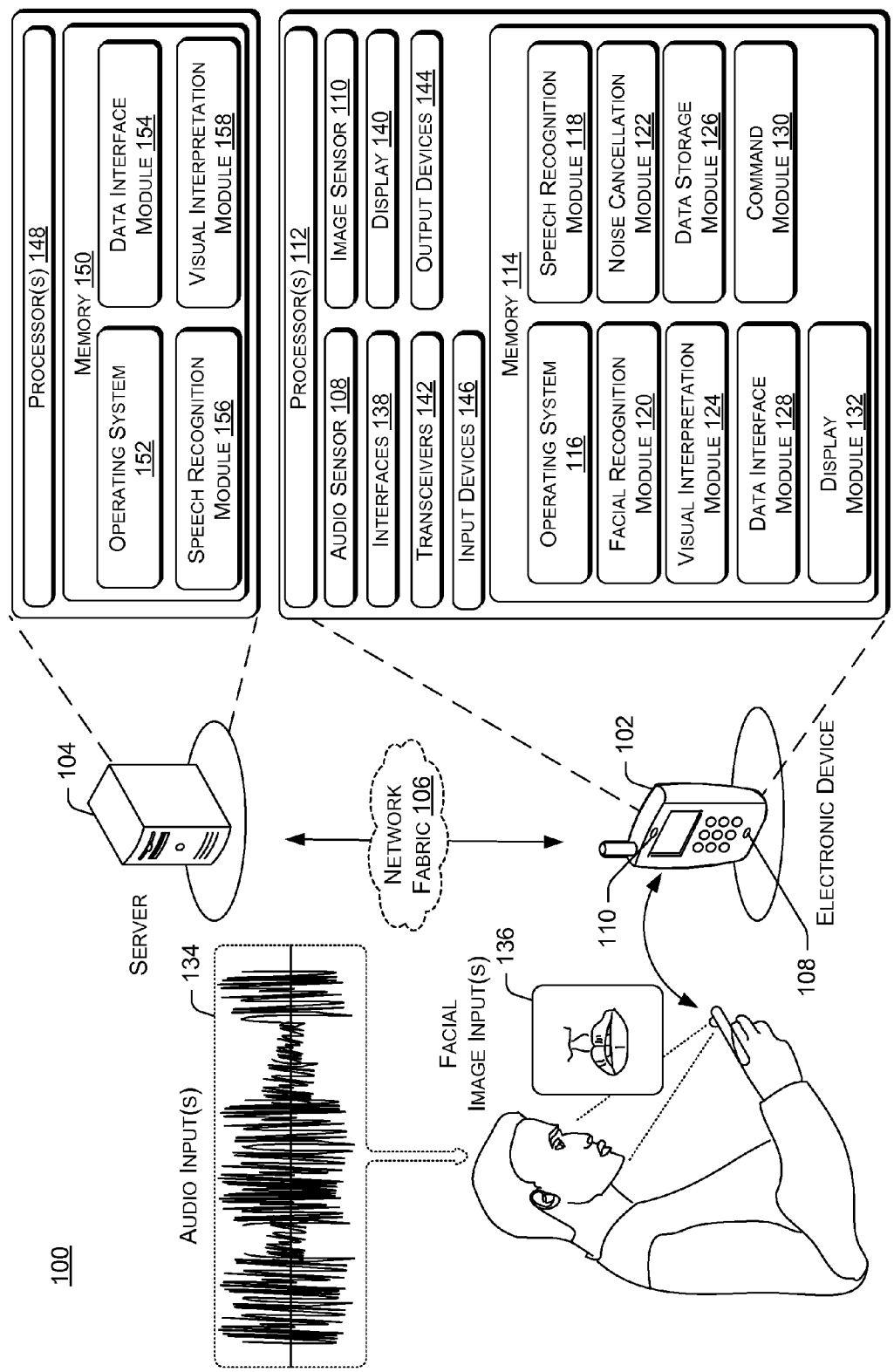
FIG. 1 is a block diagram showing an illustrative environment for implementing camera-assisted speech recognition, in accordance with various embodiments.

FIG. 1 is a block diagram showing an illustrative environment 100 for implementing camera-assisted speech recognition, in accordance with various embodiments. The environment 100 may include an electronic device 102, a server 104, and a network fabric 106.

The networking fabric 106 may represent any one or more networks, such as cellular networks and/or data networks, including WANs, LANs, PANs, and/or the Internet. A connection between the electronic device 102 and the server 104 may be through a number of routers, base stations, and/or devices acting as bridges between cellular and data networks. Communications between the sender devices 102 and the servers 104 may utilize any sort of communication protocol known in the art for sending and receiving messages, such as TCP/IP and/or HTTP. In some embodiments, the network fabric 106 may also includes an Internet service provider (ISP) providing Internet connectivity to the electronic device 102.

The electronic device 102 may be a telecommunication device (e.g., mobile phone, smart phone, personal digital assistant, etc), a portable computer, a tablet computer, a personal digital assistant (PDA), a server system, a television, a media player, a digital video recorder, a game device, or a set-top box, or any embedded device in a larger electronic system. The electronic device 102 may be connected to the servers 104 via the networking fabric 106.

The electronic device 102 may include at least one audio sensor 108 (e.g., a microphone) that captures audio from the environment, and an image sensor 110 (e.g., a camera) that captures video images. The electronic device 102 may further include one or more processors 112 and a memory 114. The memory 114 may store an operating system 116, as well as other modules camera-assisted speech recognition. The memory 114 may include both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). The memory 114 can also be described as computer storage media and may include volatile and nonvolatile, removable and non-removable media implemented in any method or technology for storage of information, such as computer readable instructions, data structures, program modules, or other data.

The operating system 116 may include components that enable the electronic device 102 to receive and transmit data via various inputs (e.g., user controls, network interfaces, and/or memory devices), as well as process data using the one or more processors 112 to generate output. The operating system 116 may include a presentation component that presents the output (e.g., display the data on an electronic display, store the data in memory, transmit the data to another electronic device, etc.). Additionally, the operating system 116 may include other components that perform various additional functions generally associated with an operating system.

The modules of the electronic device 102 may include routines, programs, objects, components, and data structures that cause the electronic device 102 to perform particular tasks. The modules may include a speech recognition module 118, a facial recognition module 120, a visual interpretation module 124, a data storage module 126, a data interface module 128, command module 130, and a display module 132.

The speech recognition module 118 may receive audio inputs 134 from the audio sensor 108 via the data interface module 128. The audio inputs may include the spoken speech from one or more speakers, and/or any ambient noise from the environment. Accordingly, the speech recognition module 118 may have some rudimentary ability to isolate the spoken speech of a particular speaker from other sounds, and process the spoken speech into a symbol sequence. For example, the speech recognition module 118 may use a noise filter to isolate the strongest audio signal and process that audio signal into a symbol sequence. As used herein, "symbol sequence" may refer to any form of electronic data that may be further converted into text data and/or machine-readable data.

In various embodiments, the speech recognition module 118 may transform each phoneme, or a basic unit of human utterance, into one or more corresponding meaningful machine-readable and interpretable symbol of a symbol sequence. In at least one embodiment, the processing of audio inputs into symbol sequences may be based on the use of Hidden Markov Models (HMMs), which are statistical models that are designed to generate a sequence of symbols for an input data set. However, it will be appreciated that in other embodiments, the speech recognition module 118 may also use other statistical and/or stochastic techniques to generate output sequence data from an input data set.

Further, the speech recognition module 118 may also transform the machine-readable symbol sequences into corresponding encoded text, such as ASCII-encoded text, that is further stored or displayed by the electronic device 102. The encoded text may be displayed by the display module 132, which may be an independent module or an integral part of the operating system 116.

The facial recognition module 120 may have the ability to detect the facial image 136 of the speaker. For example, the facial recognition module 120 may perform the face detection as a pattern classification task. In such an example, the facial recognition module 120 may use a classifier (e.g., a Bayesian classifier) that is trained based on a set of training data (e.g., multiple example faces) to determine whether an image acquired via the image sensor 110 is a facial image.

Once the facial image 136 is acquired, the facial recognition module 120 may continuously record a sequence of facial images, that is, generate a video recording of the facial image 136 over a period of time. The facial image sequence may be stored in a data storage module 126. In various embodiments, each frame of the facial image in the sequence may be time stamped so that they may be referenced by the speech recognition module 118. The facial image sequences may be buffer in the data storage module 126 for a specific duration (e.g., 5 minutes), so that any older facial images may be automatically discarded to free up memory in the data storage module 126 for the newly recorded facial images sequences.

In some instance, the facial recognition module 120 may have the ability further track the facial image 136 in order to maintain its view of the face of the speaker. For example, in embodiments where the image sensor 110 has a fixed field of view, the facial recognition module 120 may use digital zooming and panning techniques to ensure a relatively fixed view of the facial image 136 even when there are changes in (1) the distance between the image sensor 110 and the face of the speaker; and/or (2) the relative position of the face of the speaker in the field of view of the image sensor 110. For example, digital cropping and/or image interpolation may be used achieve digital zooming and panning.

In other instances in which the image sensor 110 is a motorized camera that has rotational and zoom capabilities, the facial recognition module 120 may move the image sensor 110 to track the facial image 136 of a speaker, and/or zoom in and out the image sensor 110 to view the facial image 136. Accordingly, once the facial recognition module 120 has acquired the facial image 136, the facial recognition module 120 may manipulate the image sensor 110 to maintain the facial image 136 in a relatively fixed and/or centered location in its field of view for the longest possible duration.

In at least one embodiment, the facial recognition module 120 may further use digital image processing (e.g., cropping, interpolation, etc.) to produce facial image sequences of a particular portion of a speaker's face, rather than the entire face. For example, since human speech is generally articulated by the utterance of sound that is predominately modified by a combination of lower facial features (e.g., lips, tongue, teeth, jaw, etc.), the facial recognition module 120 may generate facial image sequences of a lower portion of the face, rather than the entire face.

The noise cancellation module 122 may be able to eliminate at least some of the ambient noise that is present in the background of an audio input 134 from a speaker. In various embodiments, the noise cancellation module 122 may accomplish such ambient noise cancellation by visually detecting when a speaker is likely to be silent (e.g., no speech utterance), and when the speaker is likely to be speaking. In such embodiments, the noise cancellation module 122 may continuously and simultaneously analyze a facial image sequence of the speaker from the facial recognition module 120 and the audio input 134 from the audio sensor 108. Thus, when a facial image of the facial image sequence shows that the speaker is speaking, the noise cancellation module 122 may perform no filtering on the audio input 134. In other words, the noise cancellation module 122 may permit the unmodified audio input to be passed to another component of the electronic device 102 for further processing or storage by the electronic device 102. Conversely, when a facial image of the facial image sequence shows that the speaker is not actively speaking, the noise cancellation module 122 may filter out the temporally corresponding portion of the audio input 134 that is received from the audio sensor 108. For example, the noise cancellation module 122 may regard active movements of at least one of lips, tongue, teeth, or jaw to indicate that the speaker is actively speaking, while no movement of the lips, tongue teeth, or jaw may be regarded as indicating the lack of sound utterance by the speaker. In this way, the noise cancellation module 134 may transform the audio input 134 into a modified audio input that includes the speech utterances of the speaker interspersed with moments of silence rather than ambient noise. In some embodiments in which the electronic device 102 is a telecommunication device, the modified audio input may be transmitted by the electronic device 102 to another telecommunication device. In other embodiments, the electronic device 102 may store a particular duration of the modified audio input in the data storage 126 for additional processing (e.g., speech recognition).

The visual interpretation module 124 may transform the facial image sequences into corresponding symbol sequences. In various embodiments, the visual interpretation module 124 may recognize the visemes, or visual representation of the phonemes in human speech, that are present in a facial image sequence. Further, the visual interpretation module 124 may translate each viseme into one or more meaningful machine-readable and interpretable symbols. Thus, the visual interpretation module 124 may, when directed by the speech recognition module 118, retrieve facial image sequences that correspond to specific time periods from the data storage module 126. Following each of the retrievals, the visual interpretation module 124 may process each facial image sequence into a symbol sequence. In at least one embodiment, such processing may be based on the use of Hidden Markov Models (HMMs), which are statistical models that are designed to generate a sequence of symbols for an input data set. However, it will be appreciated that in other embodiments, the visual interpretation module 124 may also use other statistical and/or stochastic techniques to generate output sequence data from an input data set.

In some embodiments, the speech recognition module 118 may activate the visual interpretation module 124 to detect separations between words that are spoken by the speaker. In such embodiments, the visual interpretation module 124 may have the ability to detect the timing between each viseme uttered by the speaker. Thus, by comparing the timing information between the utterance of each viseme, the visual interpretation module 124 may determine the visemes that make up each word spoken by the speaker. The visual interpretation module 124 may report such timing information to the speech recognition module 118. In turn, the speech recognition module 118 may use the time information to separate the phonemes of an audio input to words. For example, the timing information may enable the speech recognition module 118 to distinguish between the utterance of the words "the saurs" and the utterance of the word "thesaurus."

The data storage module 126 may store data that are used during the operation of camera-assisted speech recognition. In various embodiments, such data may include audio inputs and associated time/date metadata, facial images and associated time/stamp metadata. The stored data may further include conversion data (e.g., classifier data) that the speech recognition module 118 and the visual interpretation module 124 may use to transform audio inputs and facial image sequences, respectively, into symbol sequences. The data may also include transformed symbol sequences and texts, command symbol sequences, as well as additional data for performing camera-assisted speech recognition.

The command module 130 may interpret the symbol sequences that are produced by the speech recognition module 118 and/or the visual interpretation module 124. In various embodiments, the command module 130 may compare each received symbol sequence to a library of pre-existing command symbol sequences that are stored in the data storage module 126. Accordingly, if at least a portion of a symbol sequence matches one of the command symbol sequences, the command module 130 may cause the electronic device 102 to perform the function designated by the symbol sequence. For example, in an instance where the electronic device 102 is a telecommunication device, the command module 130 may interpret a produced symbol sequence as matching a "compose email" command symbol sequence. Accordingly, the electronic device 102 may start an email application that is stored in the data storage module 126, so that the speaker may start composing an email.

Figure 2:
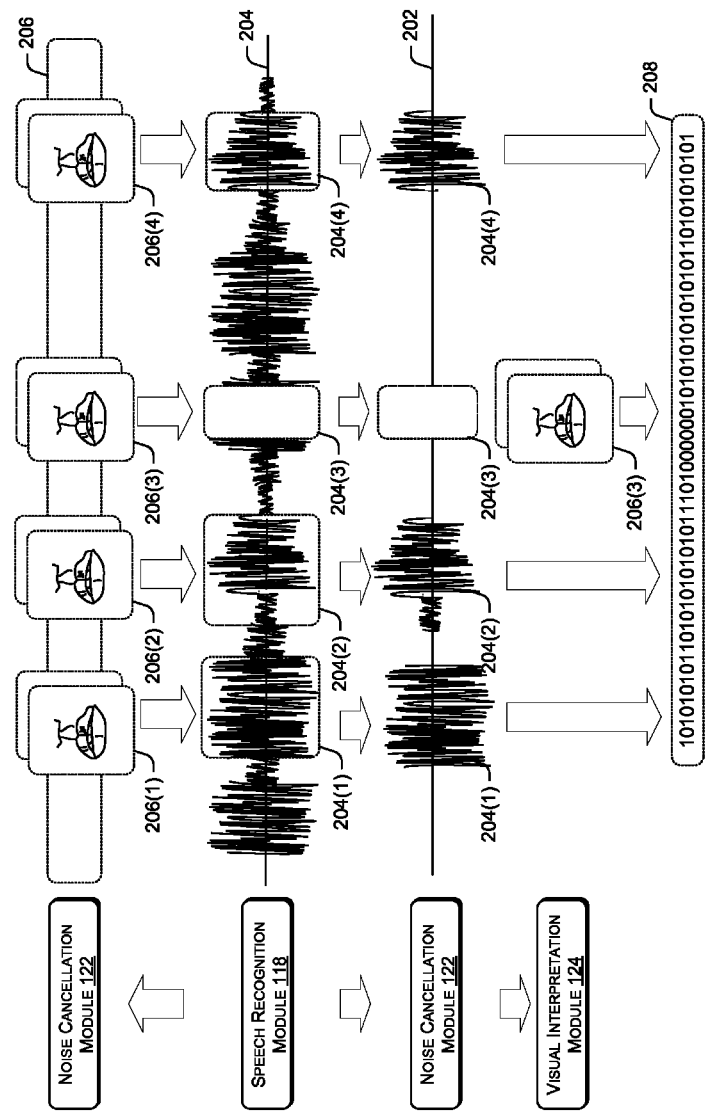
FIG. 2 is a block diagram of an example use of camera-assisted speech recognition to supplement audio-based speech recognition, in accordance with various embodiments.

As illustrated in FIG. 2, by leveraging the noise cancellation module 122 and the visual interpretation module 124, the speech recognition module 118 of the electronic device 102 may reduce or eliminate background noise, audio interference from other speakers, or mitigate the impacts of missing speech data due to hardware and/or software errors.

FIG. 2 is a block diagram of an example use of camera-assisted speech recognition system to supplement audio-based speech recognition, in accordance with various embodiments. As shown, the speech recognition module 118 may be in the process of transforming a modified audio input 202 for a time period, as represented by an audio graph, into a symbol sequence.

The modified audio input 202, that is, speech input, may be derived from an original audio input 204 by the noise cancellation module 122. The original audio input 204 may include spoken speech contributions from multiple speakers and/or ambient noise that are picked up by the audio sensor 108 of the electronic device 102. In various embodiments, the noise cancellation module 122 may derived the modified audio input 202 from the original audio input 204 with the analysis of a facial image sequence 206 from the same time period. By analyzing the facial image sequences 206, the noise cancellation module 122 may determine the portions of the time period during which the speaker shown in the facial image sequence 206 is actually speaking. For example, facial movements captured in the facial image sequence 206 may indicate that the speaker is speaking during certain portions of the time period, and is silent during other portions of the time period. In at least one embodiment, the noise cancellation module 122 may determine the time period portions based on the time stamps of each facial image in the sequence.

The noise cancellation module 122 may filter out one or more portions the audio input 204 that correspond to when the speaker is silent, i.e., not making sound utterances. As a result, the noise cancellation module 122 may form the modified audio input 202 that contains solely the speech utterances of the speaker. For example, the visual interpretation module 124 may determine that facial image sequence portions 206(1), 206(2), 206(3), and 206(4) are speaking portions of the face image sequence. Accordingly, the noise cancellation module 122 may extract audio portions 204(1), 204(2), 204(3) and 204(4), respectively, from the audio input 204 to form the modified audio input 202. In some embodiments, following the extraction, the noise cancellation module 122 may transmit the modified audio input 202 to the speech recognition module 118 so that the speech recognition module 118 may transform the modified audio input 202 into a symbol sequence.

In some instances, a particular extracted audio portion, such as extracted audio portion 204(3) may nevertheless be indecipherable by the speech recognition module 118. For example, the extracted audio portion 204(3) may contain a large quantity of ambient noise, or the spoken speech of the speaker may be overpowered, that is, drowned out, by the spoken speech of other speakers. In another example, the extracted audio portion 204(3) may be indecipherable due to software or hardware errors. In various embodiments, the speech recognition module 118 may determine whether an audio portion is decipherable via an audio transformation confidence score. Initially, the speech recognition module 118 may assign an audio transformation confidence score as the module attempts to transform the audio portion into a corresponding symbol sequence. In such embodiments, the audio transformation confidence score may represent the confidence of the speech recognition module 118 that the confidence that the symbol sequence actually represents the audio portion. For example, the greater the audio transformation confidence score of a symbol sequence, the more likely that the symbol sequence is an accurate representation of the audio portion. Conversely, the smaller the audio transformation confidence score of a symbol sequence, the less likely that the symbol sequence is an accurate transformation of the audio portion.

Accordingly, the speech recognition module 118 may determine that an audio portion is decipherable when the associated transformation confidence score of a symbol sequence obtained from an audio portion is equal to or above a predetermined audio confidence score threshold. In contrast, the speech recognition module 118 may determine that the audio portion is indecipherable when the audio transformation confidence score of a symbol sequence is below the predetermined audio confidence score threshold. In some embodiments, the speech recognition module 118 may discard any symbol sequence whose audio transformation confidence score is below the predetermined audio confidence score threshold.

As further shown in FIG. 2, the speech recognition module 118 may activate the visual interpretation module 124 for each indecipherable audio portion (e.g., extracted audio portion 204(3)). Once activated, the visual interpretation module 124 may analyze the facial image sequence portion (e.g., facial image sequence portion 206(3)) that corresponds to the indecipherable audio portion to obtain a symbol sequence. Subsequently, the speech recognition module 118 may integrate the symbol sequence from the visual interpretation module 124 with the symbol sequences of the decipherable audio portions to produce an assembled symbol sequence, such as the symbol sequence 208. In further embodiments, the speech recognition module 118 may also activate the visual interpretation module 124 for one or more indecipherable segments (e.g., one or more phonemes) of an audio portion in a similar manner, when the audio portion includes one or more decipherable segments and one or more indecipherable segments. Accordingly, the speech recognition module 118 may temporally integrate the sub symbol sequence portions derived from the one or more decipherable segments and one or more indecipherable segments to from an integrated symbol sequence.

Moreover, it will be appreciated that in some instances, a speaker may take advantage of abilities offered by the visual interpretation module 124 to mouth function commands to the electronic device 102 without actually uttering any sounds. For example, the speaker may choose to do so in extremely noisy situations or when privacy is a concern.

In additional embodiments, the visual interpretation module 124 may also have the ability to produce a visual transformation confidence score for each symbol sequence that the visual interpretation module 124 derives from a facial image sequence. Therefore, the speech recognition module 118 may derive a symbol sequence and an audio transformation confidence score for each audio portion, such as each of the audio portions 204(1)-204(4). Likewise, the visual interpretation module 124 may drive a symbol sequence and a visual transformation confidence score for each of the facial image sequences that correspond to each of the same audio portions, such as each of the audio portions 204(1)-204(1). The audio transformation confidence scores and the visual transformation confidence scores may be based on the same scale or converted to the same scale so that the two types of confidence scores may be directly comparable. In such embodiments, for each audio portion, the speech recognition module 118 may compare (1) the audio transformation confidence score of a symbol sequence obtained by the speech recognition module 118, and (2) the visual transformation confidence score of a symbol sequence obtained by the visual interpretation module 124.

Thus, for each audio portion, the speech recognition module 118 may select the symbol sequence that corresponds to the higher transformation confidence score for further processing, while the speech recognition module 118 may discard the symbol sequence with the corresponding lower transformation confidence score. For example, the visual transformation confidence score of a first symbol sequence obtained for the audio portion 204(4) by the visual interpretation module 124 may be higher than the audio transformation confidence score of a second symbol sequence obtained for the audio portion 204(4) by the speech recognition module 118. Accordingly, the speech recognition module 118 may select the first symbol sequence and discard the second symbol sequence. In further embodiments, the speech recognition module 118 and the visual interpretation module 124 may also perform such transformation confidence score comparison of obtained symbol sequences for one or more segments (e.g., one or more phonemes) within a single audio portion in a similar manner.

Returning to FIG. 1, the electronic device 102 may further include interfaces 138, a display 140, transceivers 142, output devices 144, and input devices 146. The interfaces 138 may include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the electronic device 102 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into the electronic device 102. In various embodiments, the interfaces 138 may be activated and controlled by the data interface module 128 of the electronic device 102.

The display 140 may be a liquid crystal display or any other type of display commonly used in telecommunication devices. For example, display 140 may be a touch-sensitive display screen, and can then also act as an input device or keypad, such as for providing a soft-key keyboard, navigation buttons, or the like.

The transceivers 142 may include any sort of transceivers that enable the electronic device 102 to communicate with another device via a wired connection or a wireless connection. For example, transceivers 142 may include a radio transceiver and interface that performs the function of transmitting and receiving radio frequency communications via an antenna. The radio interface facilitates wireless connectivity between the electronic device 102 and various cell towers, base stations and/or access points.

The output devices 144 may include any sort of output devices that enable the electronic device 102 to present data. The output devices 144 may include a display (already described as display 140), speakers, a vibrating mechanism, or a tactile feedback mechanism. Output devices 144 also include ports for one or more peripheral devices, such as headphones, peripheral speakers, or a peripheral display.

The input devices 146 may include any sort of input devices, in addition to the audio sensor 108 and the image sensors 110, that enables the electronic device 102 to receive data input into the electronic device 102. For example, the input devices 146 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In alternative embodiments, rather than performing speech recognition function on its own, the electronic device 102 may use the network fabric 106 to pass audio inputs and facial image sequences to the server 104 for processing. In such embodiments, the server 104 may include one or more processors 148 and a memory 150. The memory 150 may store an operating system 116, as well as other modules camera-assisted speech recognition. The memory 114 may include both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). The memory 150 can also be described as computer storage media and may include volatile and nonvolatile, removable and non-removable media implemented in any method or technology for storage of information, such as computer readable instructions, data structures, program modules, or other data.

The operating system 152 may include components that enable the electronic device 102 to receive and transmit data via various inputs (e.g., user controls, network interfaces, and/or memory devices), as well as process data using the one or more processors 148 to generate output. The operating system 152 may include a presentation component that presents the output (e.g., display the data on an electronic display, store the data in memory, transmit the data to another electronic device, etc.). Additionally, the operating system 152 may include other components that perform other functions generally associated with an operating system.

The modules of the server 104 may include routines, programs, objects, components, and data structures that cause the electronic device 102 to perform particular tasks. The modules may include a data interface module 154, a speech recognition module 156, and a visual interpretation module 158.

The data interface module 154 may communicate with the data interface module 154 of the electronic device 102 to receive the audio inputs and facial images sequences. The speech recognition module 156 and the visual interpretation module 158 may perform substantially the same functions as previously described with respect to the speech recognition module 118 and the visual interpretation module 124, respectively. Accordingly, in some embodiments, rather than performing speech recognition function, the speech recognition module 118 of the electronic device 102 may be modified to pass the audio and/or facial image data to the server 104 via the data interface module 128. Further, once the audio and facial image data are transferred to the server 104, the data may be processed into symbol sequences by the speech recognition module 118 and/or the visual interpretation module 124. Subsequently, the symbol sequences may be sent back to the speech recognition module 118 via the data interface module 154.

While some of the operations of the various modules of the electronic device 102 and the server 104 have been described above, further operation of the modules are additionally described below with respect to example processes shown in FIGS. 3-5.

Example Operations

FIG. 3 to FIG. 6 show illustrative processes 300-600 for implementing camera-assisted speech recognition. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the environment 100 of FIG. 1.

Figure 3:
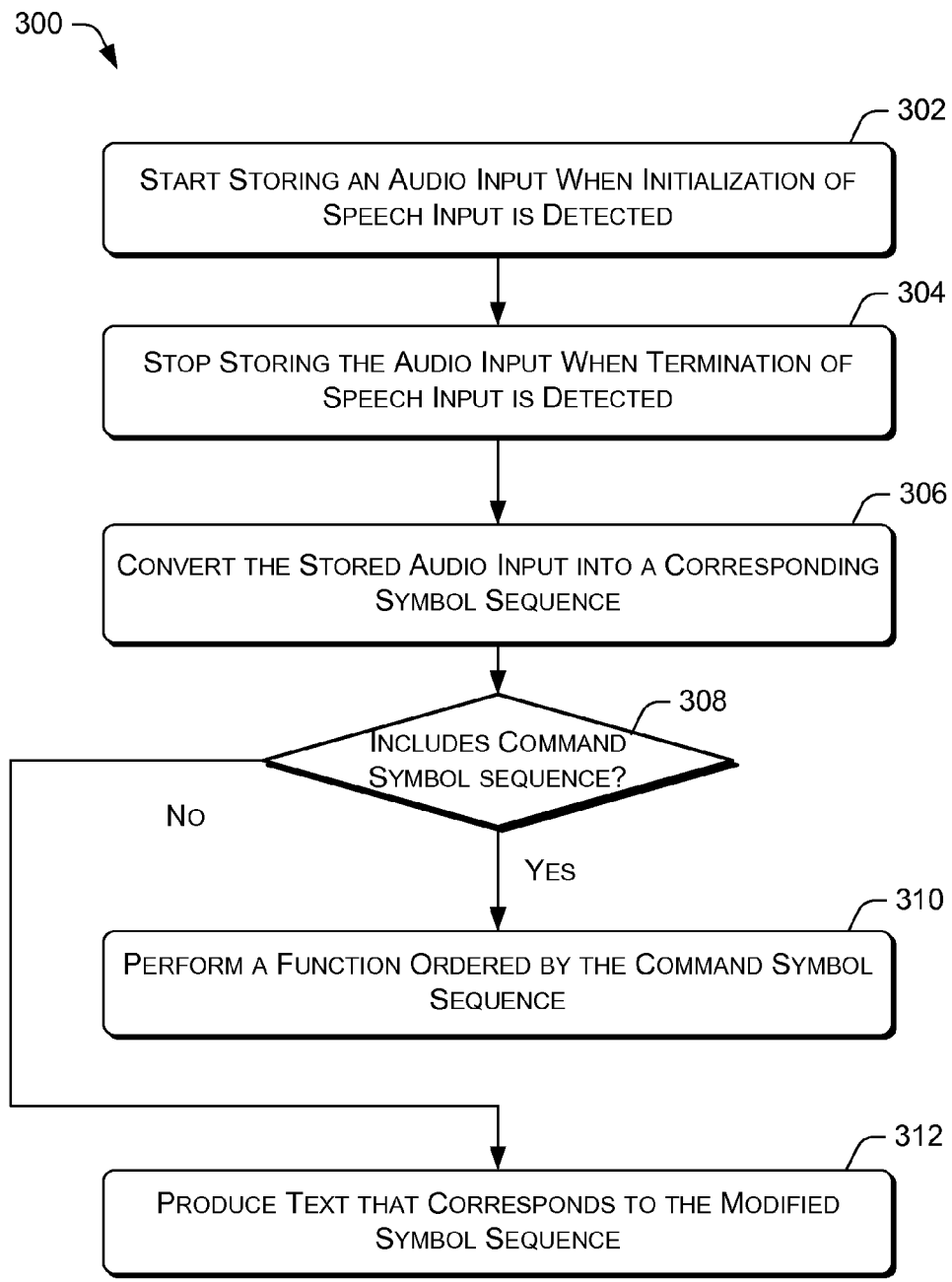
FIG. 3 is a flow chart showing a process of selectively extracting an audio signal using camera-assisted speech recognition to isolate spoken speech from a single speaker, in accordance with various embodiments.

FIG. 3 is a flow chart showing a process 300 of selectively extracting an audio signal using camera-assisted speech recognition to isolate spoken speech from a single speaker, in accordance with various embodiments.

At block 302, the speech recognition module 118 may detect the initialization of speech input. In some embodiments, the speech recognition module 118 may determine that the speech input is initialized when the noise cancellation module 122 observes facial movements that indicate the speaker has started to speak. Accordingly, the recognition module 118 may start storing (e.g., record) audio input from the audio sensor 108 in the data storage module 128. Moreover, the noise cancellation module 122 may also begin continuous monitoring of the audio input from the audio sensor 108 and the facial image sequence of the speaker received via the image sensor 110.

At block 304, the speech recognition module 118 may detect when the speaker has stopped speaking, that is, speech input has been terminated. In some embodiments, the speech recognition module 118 may determine that a speaker has stopped speaking when the noise cancellation module 122 informs the speech recognition module 118 that the speaker has stopped making facial movements for a predetermined amount of time (e.g., 0.5 seconds). In other embodiments the speech recognition module 118 may determine that a speaker has stopped speaking when the facial recognition module 120 indicates that the speaker has repositioned the electronic device 102 so that his or her facial image is no longer visible to the image sensor 110. Accordingly, the speech recognition module 118 may stop storing the audio input in the data storage module 128.

At block 306, the speech recognition module 118 may transform the audio input that is stored in the data storage module 128 into a corresponding symbol sequence. In various embodiments, the processing of audio inputs to obtain a symbol sequences may be based on the use statistical or stochastic techniques, such as Hidden Markov Models (HMMs).

At decision block 308, the command module 130 of the electronic device 102 may determine whether the obtained symbol sequence includes a command symbol sequence. In other words, whether at least a portion of the obtained symbol sequence matches a command symbol sequence that is stored in a command library of the electronic device 102. Accordingly, if the command module 130 determines that the obtained symbol sequence does include a command symbol sequence ("yes" at decision block 308), the process 300 may proceed to block 310. At block 310, the command module 310 may cause the electronic device 102 to perform a function that is ordered by the command symbol sequence.

However, if the command module 130 determines that the obtained symbol sequence does not match a command symbol sequence ("no" at decision block 308), the process 300 may proceed to block 312. At block 312, the speech recognition module 118 may produce text that corresponds to the obtained symbol sequence. The text may be further stored in a data storage module 126 of the electronic device 102, or displayed on the display 140 of the electronic device 102. For example, the audio input may be part of an email message that the speaker is composing orally on a telecommunication device, and the text of the composed email message is displayed to the speaker.

Figure 4:
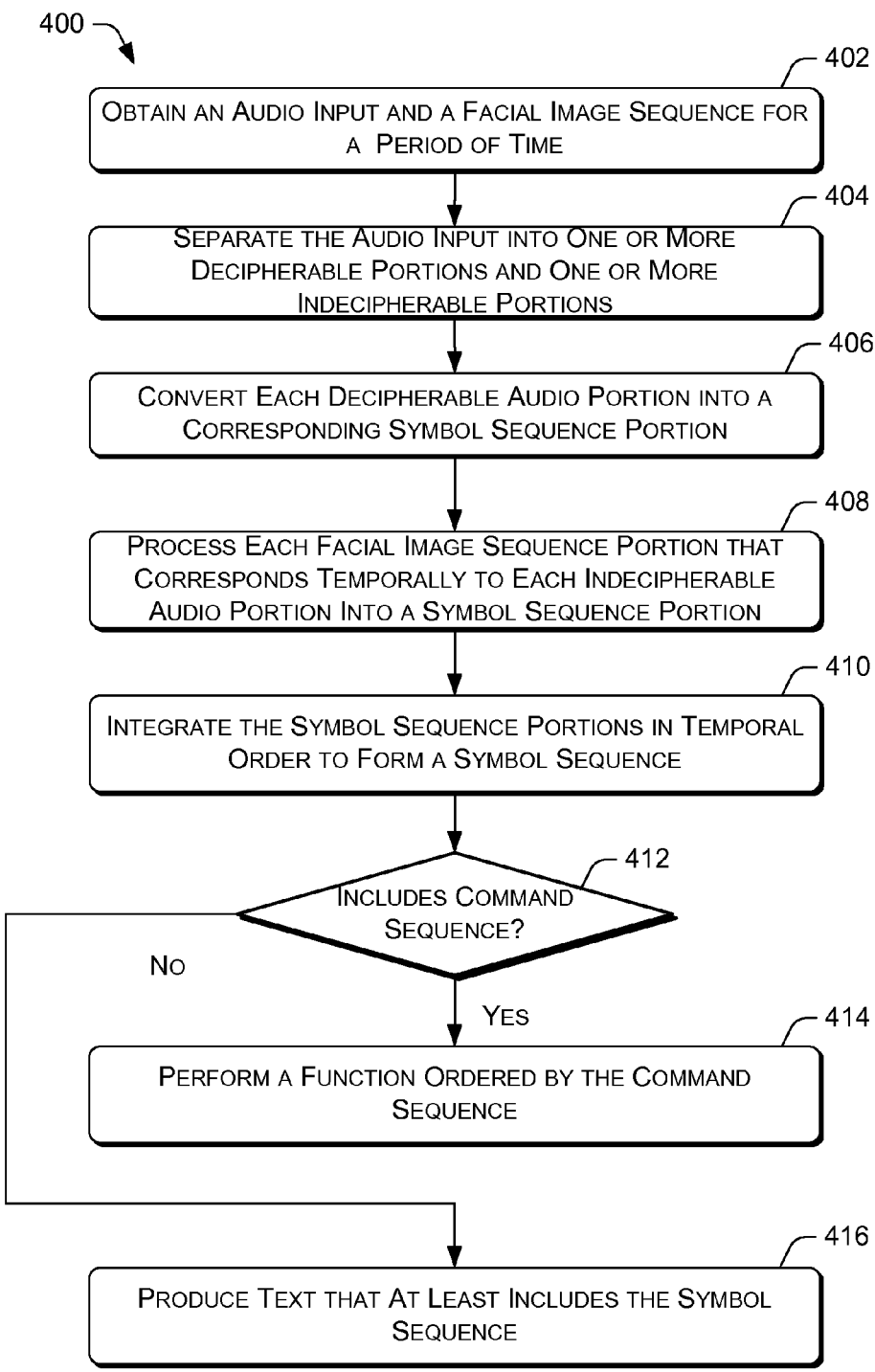
FIG. 4 is a flow chart showing a process of supplementing audio-based speech recognition with camera-assisted speech recognition, in accordance with various embodiments.

FIG. 4 is a flow chart showing a process 400 of supplementing audio-based speech recognition with camera-assisted speech recognition, in accordance with various embodiments. In some instances, the blocks 402-410 of the process 400 may further illustrate block 306 of the process 300.

At block 402, the electronic device 102 may obtain an audio input and a facial image sequence for a period of time. In various embodiments, the speech recognition module 118 may obtain the audio input, and the facial recognition module 120 may obtain the corresponding facial image sequence. In some instance, the audio input may be the entire audio input stored during a period of time. In other instances, the audio input may be a modified audio input as described in FIG. 2, in that the modified audio input contains audio portions extracted for times in which facial image sequence portions show that a speaker is speaking. In additional instances, the audio input may be an audio input that corresponds to a speaking portion shown by a facial image sequence (e.g., audio portion 204(1)), as described in FIG. 2.

At block 404, the speech recognition module 118 may separate the audio input into one or more decipherable portions and one or more indecipherable portions. In various embodiments, the speech recognition module 118 may make the separation via the transformation confidence score of each audio portion and a predetermined audio confidence score threshold.

At block 406, the speech recognition module 118 may convert each decipherable audio input portion into a corresponding symbol sequence portion. In various embodiments, the conversion of each audio input portion into a corresponding symbol sequence may be based on the use statistical or stochastic techniques, such as Hidden Markov Models (HMMs).

At block 408, the speech recognition module 118 may use the visual interpretation module 124 to process each facial image sequence portion that corresponds temporally to each indecipherable audio input portion. The processing of each facial image sequence portion may result in a corresponding symbol sequence portion. In various embodiments, the processing of each facial image sequence portion into a corresponding symbol sequence may be based on the use statistical or stochastic techniques, such as Hidden Markov Models (HMMs).

At block 410, the speech recognition module 118 may integrate the symbol sequence portions from both the speech recognition module 118 and the visual interpretation modules 122 in temporal order, that is, in chronological order. The integration may generate a symbol sequence.

At decision block 412, the command module 130 of the electronic device 102 may determine whether the generated symbol sequence includes a command symbol sequence. In other words, whether at least a portion of the obtained symbol sequence matches a command symbol sequence that is stored in a command library of the electronic device 102. Accordingly, if the command module 130 determines that the obtained symbol sequence does include a command symbol sequence ("yes" at decision block 412), the process 400 may proceed to block 414. At block 414, the command module 130 may cause the electronic device 102 to perform a function that is ordered by the command symbol sequence.

However, if the command module 130 determines that the obtained symbol sequence does not match a command symbol sequence ("no" at decision block 412), the process 400 may proceed to block 416. At block 416, the speech recognition module 118 may further produce text that corresponds to the generated symbol sequence. The text may be further stored in a data storage module 126 of the electronic device 102, or displayed on the display 140 of the electronic device 102. For example, the modified audio input may be an email message that the speaker is composing orally on a telecommunication device, and the text of the composed email message is displayed to the speaker.

Figure 5:
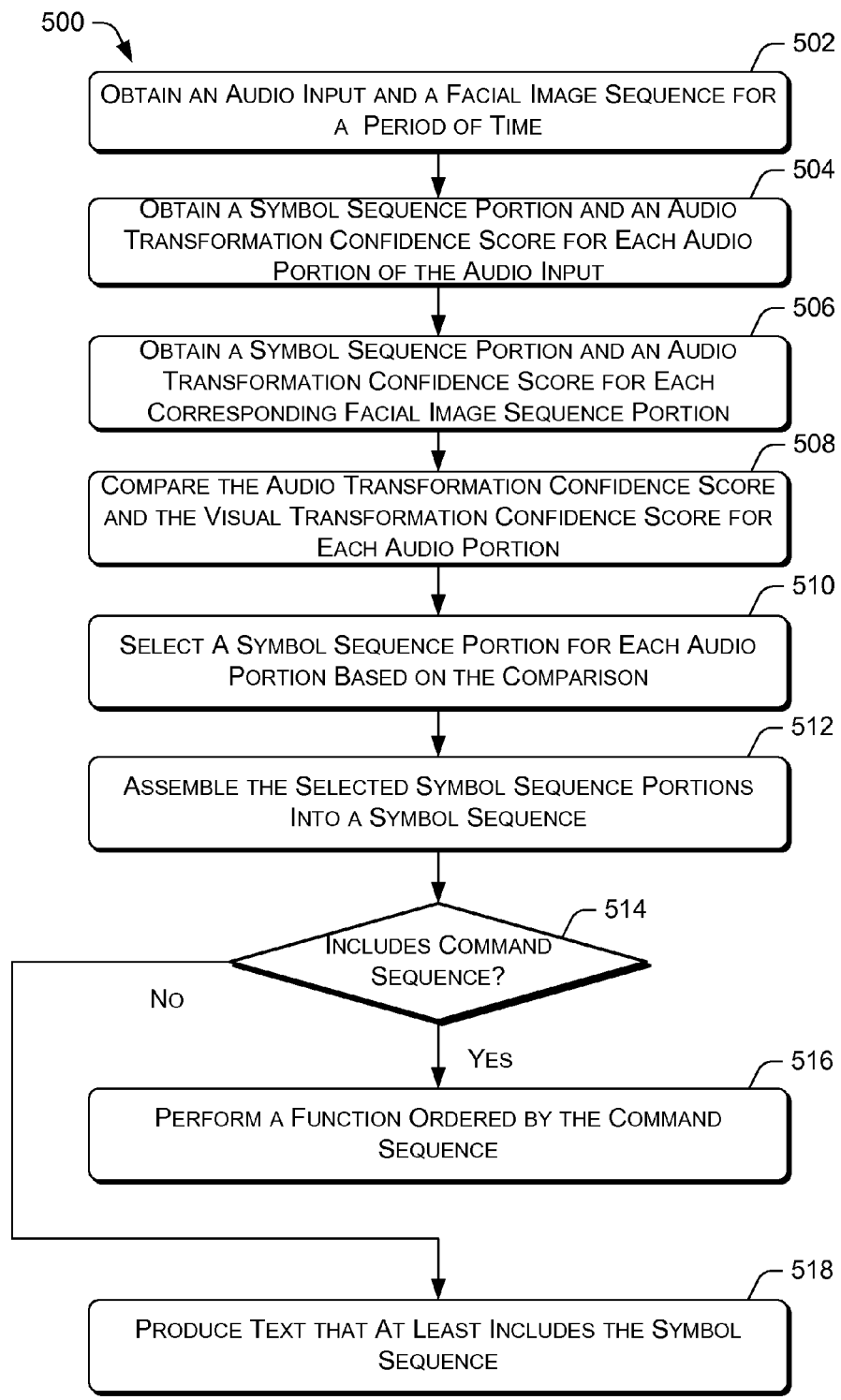
FIG. 5 is a flow chart showing a process of selectively supplementing audio-based speech recognition with camera-assisted speech recognition based on transformation confidence scores, in accordance with various embodiments.

FIG. 5 is a flow chart showing a process 500 of selectively supplementing audio-based speech recognition with camera-assisted speech recognition based on transformation confidence scores, in accordance with various embodiments.

At block 502, the electronic device 102 may obtain an audio input and a facial image sequence for a period of time. In various embodiments, the speech recognition module 118 may obtain the audio input, and the facial recognition module 120 may obtain the corresponding facial image sequence. In some instance, the audio input may be the entire audio input stored during a period of time. In other instances, the audio input may be a modified audio input as described in FIG. 2, in that the modified audio input contains audio portions extracted for times in which facial image sequence portions show that a speaker is speaking. In additional instances, the audio input may be an audio input that corresponds to a speaking portion shown by a facial image sequence (e.g., audio portion 204(1)), as described in FIG. 2.

At block 504, the speech recognition module 118 may obtain a symbol sequence portion and an audio transformation confidence score for each audio portion of the audio input. In various embodiments, the conversion of each audio portion into a corresponding symbol sequence may be based on the use statistical or stochastic techniques, such as Hidden Markov Models (HMMs).

At block 506, the visual interpretation module 124 may obtain a symbol sequence portion and an audio transformation confidence score for each facial image sequence portion that corresponds to each audio portion. In various embodiments, the processing of each facial image sequence portion into a corresponding symbol sequence portion may be based on the use statistical or stochastic techniques, such as Hidden Markov Models (HMMs).

At block 508, the speech recognition module 118 may compare the audio transformation confidence score and the visual transformation confidence score of the respective symbol sequence portions that correspond to each audio portion. In various embodiments, the audio transformation confidence scores and the visual transformation confidence scores may be based on the same scale or converted to the same scale so that the scores are directly comparable.

At block 510, the speech recognition module 118 may select a symbol sequence portion obtained by the speech recognition module 118 or a symbol sequence portion obtained by the visual interpretation module 124 for each audio portion based on the comparison of the respective transformation confidence scores. Further, the speech recognition module 118 may discard the symbol sequence portion with the corresponding lower transformation confidence score. In scenarios for which the visual transformation confidence score and the audio transformation confidence score of an audio portion are equal, the speech recognition module 118 may determine whether the audio transformation confidence score of the audio portion is equal to or higher than the predetermined audio confidence score threshold. Thus, if the audio transformation confidence score is equal to or higher than the predetermined audio confidence score threshold, the speech recognition module 118 may select the symbol sequence portion corresponding to the audio transformation confidence score. However, if the audio transformation confidence score is less than the predetermined audio confidence score threshold, the speech recognition module 118 may select the symbol sequence portion that corresponds to the visual transformation confidence score.

In alternative embodiments, for scenarios in which the visual transformation confidence score and the audio transformation confidence score of an audio portion are equal, the speech recognition module 118 may default to selecting the symbol sequence portion that corresponds to the audio transformation confidence score or the visual transformation confidence score, while discarding the other symbol sequence portion.

At block 512, the speech recognition module 118 may assemble the selected symbol sequence portions in temporal order to generate a symbol sequence.

At decision block 514, the command module 130 of the electronic device 102 may determine whether the generated symbol sequence includes a command symbol sequence. In other words, whether at least a portion of the generated symbol sequence matches a command symbol sequence that is stored in a command library of the electronic device 102. Accordingly, if the command module 130 determines that the generated symbol sequence does include a command symbol sequence ("yes" at decision block 514), the process 400 may proceed to block 516. At block 516, the command module 516 may cause the electronic device 102 to perform a function that is ordered by the command symbol sequence.

However, if the command module 130 determines that the generated symbol sequence does not match a command symbol sequence ("no" at decision block 514), the process 400 may proceed to block 518. At block 518, the speech recognition module 118 may further produce text that corresponds to the symbol sequence. The text may be further stored in a data storage module 126 of the electronic device 102, or displayed on the display 140 of the electronic device 102. For example, the audio input may be an email message that the speaker is composing orally on a telecommunication device, and the text of the composed email message is displayed to the speaker.

Figure 6:
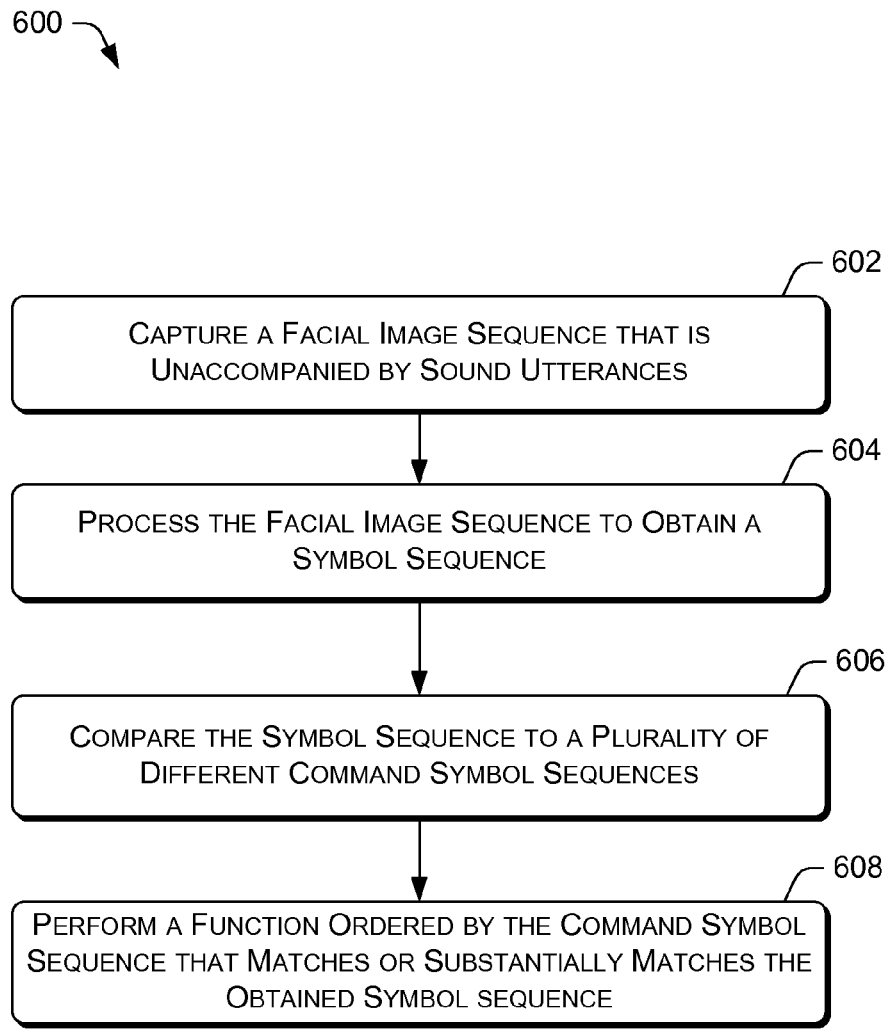
FIG. 6 is a flow chart showing a process of implementing camera-assisted speech recognition to control an electronic device, in accordance with various embodiments.

FIG. 6 is a flow chart showing a process 600 of implementing camera-assisted speech recognition to control an electronic device, in accordance with various embodiments. At block 602, the visual interpretation module 124 may capture a facial image sequence that is unaccompanied by sound utterances. In some embodiments, the speaker may initiate such a capture by activating an input device 146 of the electronic device 102 (e.g., clicking on a pre-designated interface key), then mouth the words to be captured with uttering any sound. In other embodiments, the speaker may initiate such a capture by positioning the image sensor 110 of the electronic device 102 within a certain distance threshold (e.g., within 5 inches) of his or her lower face portion and then mouth the words to be captured without uttering any sound.

At block 604, the speech recognition module 118 may determine that there is no spoken speech input. In some embodiments, the speech recognition module 118 may make this determination based on the user activation of a particular input device 146. In other embodiments, the speech recognition module 118 may make this determination when it is unable to capture any sound, or that the speech recognition module 118 determines that no part of the captured audio input matches the mouth movement captured by the visual interpretation module 124. Accordingly, the speech recognition module 118 may command the visual interpretation module 124 to process the facial image sequence to generate a symbol sequence.

At block 606, the command module 130 of the electronic device 102 may compare the generated symbol sequence to a plurality of command symbol sequences. At block 608, the command module 130 may cause the electronic device 102 to perform a function that is ordered by the command symbol sequence that matches or substantially matches the obtained symbol sequence. However, if the obtained symbol sequence does not match or substantially match any of the command symbol sequences, the command module 130 may terminate the process 600.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A computer-implemented method, comprising:
  receiving an audio input and a facial image sequence for a period of time at an electronic device, the audio input including a decipherable portion and an indecipherable portion;
  converting the decipherable portion of the audio input into a first symbol sequence portion, the converting including:
    detecting separations between spoken words in the decipherable segment based on the facial image sequence, and
    processing the decipherable portion into the first symbol sequence portion based in part on the detected separations;
  processing a portion of the facial image sequence that corresponds temporally to the indecipherable portion of the audio input into a second symbol sequence portion; and integrating the first symbol sequence portion and the second symbol sequence portion in temporal order to form a symbol sequence.

2. The computer-implemented method of claim 1, further comprising:
identifying portions of the facial image sequence that indicate a particular speaker is silent; and
filtering out portions of the audio input that correspond to the portions of the facial image sequence that indicate the particular speaker is silent.

3. The computer-implemented method of claim 2, wherein the identifying includes identifying portions of the facial image sequence that indicate the particular speaker is silent based on facial features of the particular speaker shown in the portions of the facial image sequence.

4. The computer-implemented method of claim 1, further comprising transmitting the symbol sequence to another electronic device or storing the symbol sequence in a data storage on the electronic device.

5. The computer-implemented method of claim 1, wherein the receiving includes receiving the audio input via a microphone of an electronic device and receiving the facial image sequence via a camera of the electronic device.

6. The computer-implemented method of claim 1, further comprising determining that speech input is initiated when the facial image sequence indicates that a particular speaker begins to utter sounds.

7. The computer-implemented method of claim 6, further comprising determining that the speech input is terminated when a facial image of the particular speaker moves out of the view of a camera of the electronic device or when the facial image sequence indicates that the particular speaker has not uttered sounds for a predetermined period of time.

8. A computer-implemented method, comprising:
receiving an audio input and a facial image sequence for a period of time at an electronic device, the audio input including speech inputs from multiple speakers;
extracting a speech input of a particular speaker from the audio input based on the received facial image sequence, including selecting portions of the audio input that correspond to speech movement indicated by the facial image sequence, at least one selected portion including a decipherable segment and an indecipherable segment; and
processing the extracted speech input into a symbol sequence, the processing including:
converting the decipherable segment into a first sub symbol sequence portion, the converting including:
detecting separations between spoken words in the decipherable segment based on the facial image sequence, and
processing the decipherable portion into the first sub symbol sequence portion based in part on the detected separations;
processing a portion of the facial image sequence that corresponds temporally to the indecipherable segment into a second sub symbol sequence portion; and
integrating the first sub symbol sequence portion and the second sub symbol sequence portion in temporal order to form one of the corresponding symbol sequence portions.

9. The computer-implemented method of claim 8, further comprising converting the symbol sequence into text for display by the electronic device.

10. The computer-implemented method of claim 8, furthering comprising matching the symbol sequence to a command that causes the electronic device to perform a function.

11. The computer-implemented method of claim 8, wherein the receiving includes receiving the audio input via a microphone of an electronic device and receiving the facial image sequence via a camera of the electronic device.

12. The computer-implemented method of claim 8, wherein the processing includes:
converting each of the selected audio input portions into a corresponding symbol sequence portion; and
assembling the symbol sequence portions into a symbol sequence.

13. The computer-implemented method of claim 8, wherein the processing includes:
obtaining a first symbol sequence portion and a corresponding audio transformation confidence score for an audio input portion;
obtaining a second symbol sequence portion and a corresponding visual transformation confidence score for each facial image sequence that corresponds to the audio input portion;
comparing the audio transformation confidence score and the visual transformation confidence score of the audio portion;
selecting the first symbol sequence portion for assembly into the symbol sequence when the audio transformation confidence score is higher than the visual transformation confidence score; and
selecting the second symbol sequence portion for assembly into the symbol when the visual transformation confidence score is higher than the audio transformation confidence score.

14. The computer-implemented method of claim 13, further comprising selecting the first symbol sequence portion for assembly into the symbol sequence when the audio transformation confidence score is equal to the visual transformation confidence score and the audio transformation confidence score is equal to or higher than a predetermined audio confidence score threshold.

15. The computer-implemented method of claim 13, further comprising selecting the first symbol sequence portion or the second symbol sequence portion for assembly into the symbol sequence when the audio transformation confidence score is equal to the visual transformation confidence score.

16. The computer-implemented method of claim 8, wherein the indecipherable segment is masked by ambient noise or an audio input portion in which data is missing.

17. The computer-implemented method of claim 8, further comprising determining that a segment of one of the selected portions is an indecipherable segment when a transformation confidence score of a sub symbol sequence portion obtained from the segment is below a predetermined audio confidence score threshold.

18. The computer-implemented method of claim 8, further comprising determining that the audio input is initiated when the facial image sequence indicates that a speaker begins to utter sounds.

19. The computer-implemented method of claim 8, further comprising determining that the audio input is terminated when a facial image of a speaker moves out of the view of a camera of the electronic device or when the facial image sequence indicates that the speaker has not uttered sounds for a predetermined period of time.

20. The computer-implemented method of claim 8, wherein the audio input contains one or more phonemes and the facial image sequence includes one or more visemes.

21. An article of manufacture comprising:
a storage medium; and
computer-readable programming instructions stored on the storage medium and configured to program a computing device to perform operations including:
  receiving an audio input and a facial image sequence for a period of time at an electronic device, wherein the audio input includes a decipherable portion and an indecipherable portion;
  converting the decipherable portion of the audio input into a first symbol sequence portion, the converting including:
    detecting separations between spoken words in the decipherable segment based on the facial image sequence, and
    processing the decipherable portion into the first symbol sequence portion based in part on the detected separations;
  processing a portion of the facial image sequence that corresponds temporally to the indecipherable portion of the audio input into a second symbol sequence portion; and
  integrating the first symbol sequence portion and the second symbol sequence portion in temporal order to form a symbol sequence.

22. The article of claim 21, wherein the operations further include converting the symbol sequence into text for display by the electronic device.

23. The article of claim 21, wherein the operations further includes determining that a portion of the audio input is an indecipherable portion when a transformation confidence score of a symbol sequence obtained from the portion is below a predetermined audio confidence score threshold.

24. The article of claim 21, wherein the operations further include further determining that the audio input is initiated when the facial image sequences indicate that a speaker begins to utter sounds, and determining that the audio input is terminated when a facial image of a speaker moves out of the view of a camera of the electronic device or when the facial image sequence indicates that the speaker has not uttered sounds for a predetermined period of time.

25. The article of claim 21, wherein the receiving includes receiving the audio input via a microphone of an electronic device and receiving the facial image sequence via a camera of the electronic device.

26. A device comprising:
  a microphone to receive an audio input from an environment;
  a camera to receive a plurality of facial image sequences, the camera configured to automatically track a face of a speaker associated with the facial image sequences to maintain its view of the face;
  a processor;
  a memory that stores a plurality of modules that comprises:
    a visual interpretation module to process a portion of an facial image sequence into a symbol sequence, wherein the facial image sequence corresponds temporally to an indecipherable portion of an audio input;
    a speech recognition module to convert a decipherable portion of the audio input into another symbol sequence, and to integrate the symbol sequences in temporal order to form an integrated symbol sequence; and
    a command module to cause the device to perform a function in response at least to the symbol sequence.

27. The device of claim 26, wherein the speech recognition module is to further convert the symbol sequence into text for display on the device.

28. The device of claim 26, wherein the command module is to further cause the device to perform a function in response to the integrated symbol sequence.

* * * * *